No. 856,618. PATENTED JUNE 11, 1907.
F. A. BROWNELL.
FOCUSING SCREEN FOR CAMERAS.
APPLICATION FILED JAN. 15, 1904.
2 SHEETS—SHEET 1.
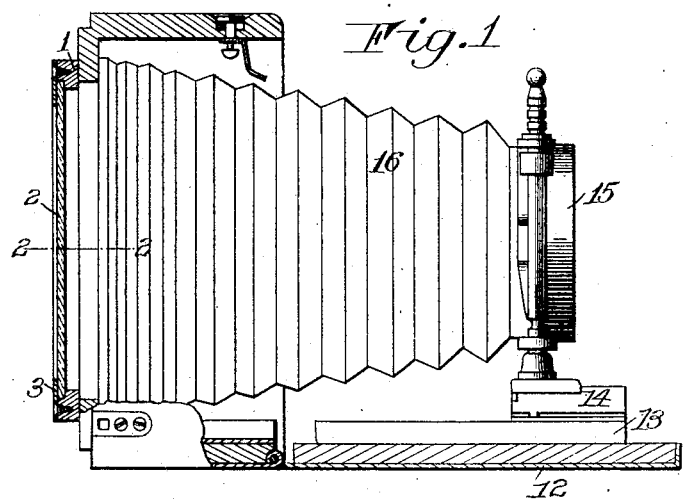
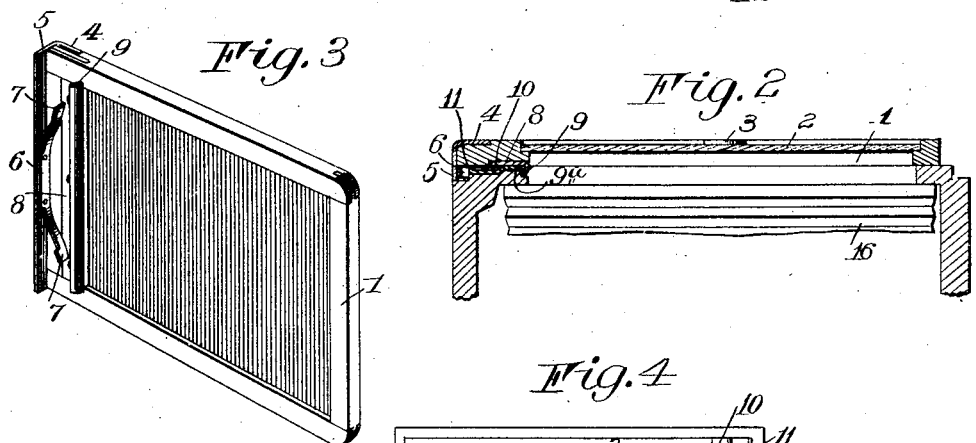
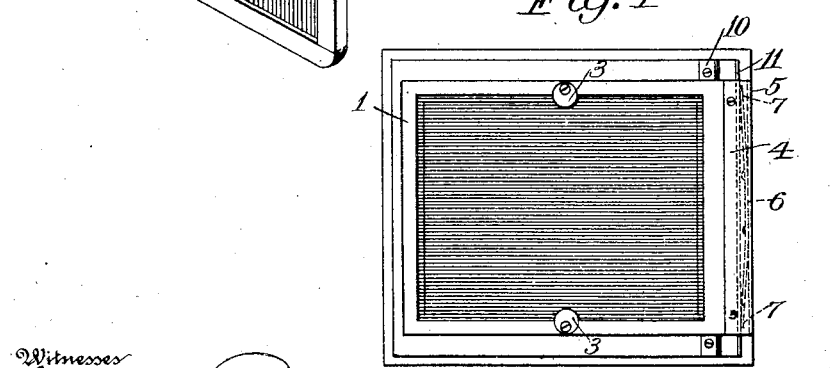
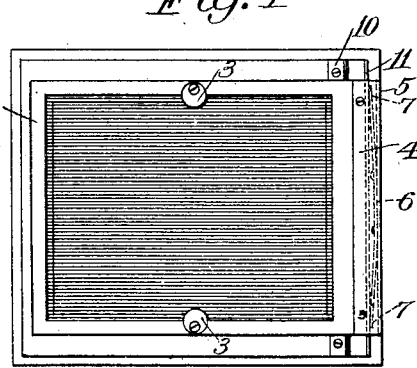

No. 856,618. PATENTED JUNE 11, 1907.
F. A. BROWNELL.
FOCUSING SCREEN FOR CAMERAS.
APPLICATION FILED JAN. 15, 1904.

2 SHEETS—SHEET 2.

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

FOCUSING-SCREEN FOR CAMERAS.

No. 856,618.            Specification of Letters Patent.            Patented June 11, 1907.

Original application filed January 12, 1903, Serial No. 138,636. Divided and this application filed January 15, 1904. Serial No. 189,143.

*To all whom it may concern:*

Be it known that I, FRANK A. BROWNELL, of Rochester, in the county of Monroe and State of New York, have invented certain new and useful Improvements in Focusing-Screens for Cameras; and I do hereby declare the following to be a full, clear, and exact description of the same, reference being had to the accompanying drawings forming a part of this specification, and to the reference-numerals marked thereon.

My present invention relates to improvements in photographic cameras, and it has for its object to provide a focusing screen that may be readily attached to and detached from the camera casing, and which is particularly applicable to a folding camera of the type shown and described in my prior application, filed January 12th, 1903, serially numbered 138,636, of which application this is a division.

Figure 5:
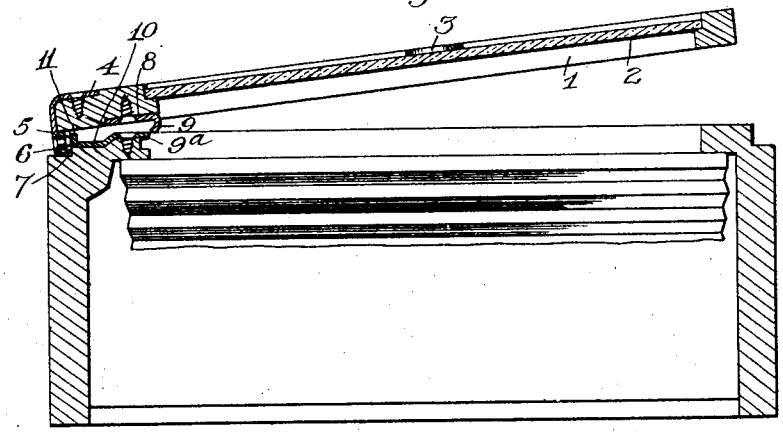
Figure 6:
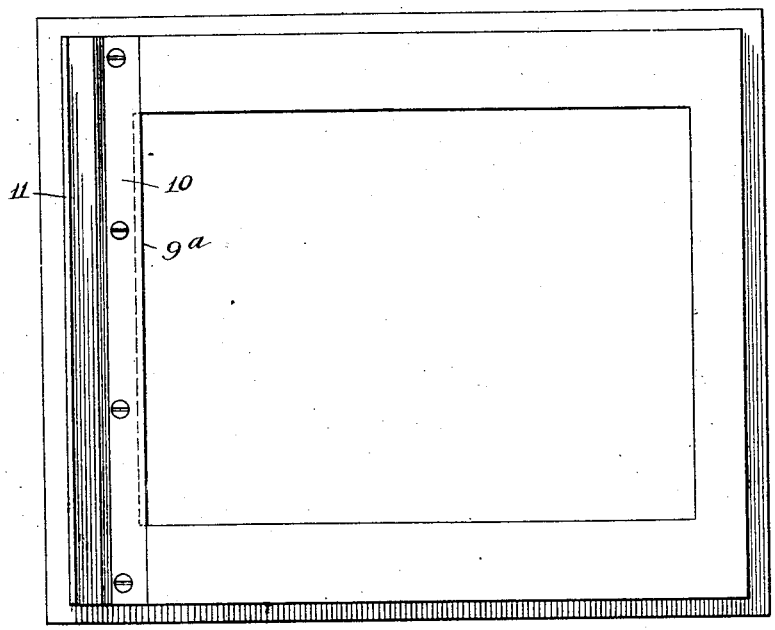

In the accompanying drawing:—Figure 1 is a side elevation of a camera with parts thereof in section showing a focusing screen embodying my invention applied thereto; Fig. 2 represents a section on the line 2—2 Fig. 1, parts being broken away; Fig. 3 is a perspective view of the screen detached from the camera, and Fig. 4 is a rear elevation of the camera showing the screen in position thereon. Fig. 5 is an enlarged view similar to Fig. 2, illustrating the application of the cover or frame to the camera casing, and Fig. 6 is a rear view of the camera casing.

A focusing screen as illustrated in the present embodiment of my invention comprises a frame 1 the size and dimensions of which are such as to conform to those of the rear of the camera casing. In this frame is set the ground glass 2 which is held therein by means of the retaining devices 3—3 carried by the frame, and at one edge of the screen thus formed is secured a plate 4 having one edge thereof bent to form the laterally projecting shoulder 5 carrying upon its inner side the double leaf spring 6, the extremities of which are preferably widened or enlarged as at 7, for a purpose that will hereinafter appear. Directly opposite this spring is provided a plate 8 secured to the screen frame and having its outer edge doubled over to form an overhanging ledge 9. This ledge 9 is adapted to engage the edge 9ª of the plate 10 carried on the rear of the camera casing, the opposite edge of the latter plate being bent up to form a shoulder 11 for the extremities 7 of the spring 6.

In the present embodiment of my invention I have shown the focusing screen applied to a well known type of folding camera, the body of which is provided with a hinged front board or door 12 carrying ways 13 on which the lens support 14 carrying the lens 15 is adapted to slide, the usual bellows 16 connecting the lens support and the rear of the camera casing being provided, and for convenience in manipulation the screen attaching means carried by the camera casing are formed at the side of the rear frame thereof, but it will be understood that these attaching devices may be formed above or below as well as at either side of the aperture in the rear of the casing.

A focusing screen constructed in accordance with my invention may be readily applied to the camera casing by bringing it into such a position that the extremities 7—7 of the spring 6 rest against the shoulder 11 on the casing, pressure on the frame causing the spring to compress and thereby permit the overhanging ledge 9 to slip over, and engage behind the edge 9ª of the plate 10, displacement of the frame being prevented for the reason that the pressure produced by the action of the spring 6 will normally retain the ledge 9 in engagement with the plate 10, the order of operations being reversed in removing the screen from the camera.

By providing a camera with fastening devices arranged at one side of the opening therein two interlocking members which are capable of disengagement by a relative movement of one upon the other, may be employed forming a simple means for detachably connecting any described form of cover over said opening in the camera.

I claim as my invention:

1. The combination with a camera open at the rear and an overhanging projection thereon at one side of the opening, of a removable cover having a projection engaging the one on the camera, and a spring mounted on the cover and coöperating with the camera to hold the projections in engagement.

2. The combination with a camera having the open rear frame and the ledge at one side thereof, of a removable focusing screen adapted to be applied to the frame having the hooked ledge for engaging the one on the camera and a spring for moving the screen to hold said ledges in engagement.

3. The combination with a camera having the open rear frame, and the ledge at one side thereof, of a removable focusing screen fitting over the frame opening and having the hooked ledge engaging the ledge on the camera frame and a spring for operating the screen laterally to hold the ledges in engagement.

4. The combination with a camera having the open rear frame and the ledge at one side thereof, of a removable screen having the hooked ledge engaging the ledge on the side of the frame opening, and the spring on the screen engaging the camera and holding the ledges in engagement.

5. The combination with a camera having the open rear frame and the ledge at one side thereof, of a removable focusing screen having the hooked ledge engaging the ledge on the side of the frame opening, and the spring on the screen engaging the outer side of the camera frame operating to move the frame laterally and hold the ledges in engagement.

6. The combination with a camera having the open rear frame and the plate at one side thereof forming an inner overhanging ledge and an outer shoulder, of the removable focusing screen fitting over the camera frame and having the hooked plate engaging the plate on the camera frame, and the spring having the free ends coöperating with the shoulder on the plate.

7. The combination with a camera open at one side and a cover for said opening, of two interlocking members capable of detachment by a relative lateral movement of one upon the other, said members being applied to the camera and cover respectively at one side of the opening.

FRANK A. BROWNELL.

Witnesses:
G. WILLARD RICH,
F. N. HOWARD.